(12) United States Patent
D'Aluisio et al.

(10) Patent No.: US 8,641,071 B2
(45) Date of Patent: Feb. 4, 2014

(54) BICYCLE FRAME

(75) Inventors: Christopher P. D'Aluisio, Corralitos, CA (US); Jean-Luc Callahan, San Jose, CA (US); Mark Cote, Aptos, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 192 days.

(21) Appl. No.: 13/022,477

(22) Filed: Feb. 7, 2011

(65) Prior Publication Data

US 2012/0200060 A1 Aug. 9, 2012

(51) Int. Cl.
*B62K 19/02* (2006.01)
*B62K 3/02* (2006.01)

(52) U.S. Cl.
CPC .. *B62K 19/02* (2013.01); *B62K 3/02* (2013.01)
USPC ........................................ 280/281.1; 280/288

(58) Field of Classification Search
USPC .............. 280/281.1, 274, 284, 288, 276, 279, 280/285
See application file for complete search history.

(56) References Cited

U.S. PATENT DOCUMENTS

| | | | |
|---|---|---|---|
| 623,495 A * | 4/1899 | Trebert | 403/219 |
| 4,484,756 A * | 11/1984 | Takamiya et al. | 280/281.1 |
| 4,889,355 A | 12/1989 | Trimble et al. | |
| 4,900,048 A | 2/1990 | Derujinsky | |
| 4,941,674 A | 7/1990 | Trimble | |
| 5,221,102 A | 6/1993 | Spangler | |
| 5,253,890 A | 10/1993 | Takamiya et al. | |
| 5,441,291 A * | 8/1995 | Girvin, III | 280/276 |
| 5,456,481 A | 10/1995 | Allsop et al. | |
| 5,464,240 A | 11/1995 | Robinson et al. | |
| 5,544,907 A | 8/1996 | Lin et al. | |
| 6,017,048 A | 1/2000 | Fritschen | |
| 6,270,104 B1 | 8/2001 | Nelson et al. | |
| 6,503,589 B1 | 1/2003 | Fritschen | |
| 6,848,700 B1 | 2/2005 | Fritschen | |
| 6,889,992 B2 | 5/2005 | Vroomen et al. | |
| 7,147,237 B2 | 12/2006 | Cobb | |
| 7,188,852 B1 | 3/2007 | Fritschen | |
| RE40,200 E | 4/2008 | Fritschen | |
| 7,516,970 B2 | 4/2009 | Fritschen | |
| 2005/0151344 A1* | 7/2005 | Parkin | 280/284 |
| 2007/0063476 A1* | 3/2007 | Yu | 280/279 |
| 2008/0035431 A1* | 2/2008 | Vroomen et al. | 188/24.21 |
| 2008/0238026 A1 | 10/2008 | Callahan et al. | |
| 2010/0096832 A1* | 4/2010 | Pinarello | 280/281.1 |
| 2010/0225090 A1 | 9/2010 | Cusack et al. | |
| 2011/0248469 A1* | 10/2011 | Chubbuck et al. | 280/276 |
| 2012/0098232 A1* | 4/2012 | Calabresse Muzzi | 280/281.1 |

FOREIGN PATENT DOCUMENTS

EP 2311718 4/2011

* cited by examiner

*Primary Examiner* — Anne Marie Boehler
*Assistant Examiner* — Maurice Williams
(74) *Attorney, Agent, or Firm* — Michael Best & Friedrich LLP

(57) ABSTRACT

A bicycle frame that supports a front wheel and a rear wheel defining a central plane. The bicycle frame includes a head tube, a bottom bracket configured to support a crank assembly, and a bicycle frame portion. The bicycle frame portion includes a leading edge and a trailing edge oriented such that a chord line between the leading edge and the trailing edge defines an angle of incidence greater than zero degrees relative to the central plane.

15 Claims, 8 Drawing Sheets

US 8,641,071 B2

BICYCLE FRAME

BACKGROUND

The present invention relates to bicycles, and more particularly to frames for bicycles.

Bicycle frames typically include a fork assembly for supporting a front wheel, a seat tube, a top tube, and a down tube. The top and down tubes are interconnected to the fork assembly by a head tube, and to the seat tube typically near a middle portion of the bicycle. A bottom bracket that supports a crank set is often located near an intersection of the down tube and the seat tube. The crank set is utilized by the rider to drive a rear wheel. In many bicycles, a seat post is received in the seat tube above the top tube. The seat post is secured to a seat that supports the rider on the bicycle. A typical bicycle frame also includes rear dropouts for receiving a rear wheel. The rear dropouts are commonly connected to the remainder of the frame by stays, such as seat stays and chain stays.

SUMMARY

The dynamics of a bicycle frame can be altered by changing the materials, shapes, and dimensions of the frames parts. For example, it may be desired to have a frame that has a certain shape characteristics based on the direction of airflow over the frame components.

The present invention provides a bicycle frame that supports a front wheel and a rear wheel that defines a central plane. The bicycle frame includes a head tube, a bottom bracket configured to support a crank assembly, and a bicycle frame portion. The bicycle frame portion includes a leading edge and a trailing edge oriented such that a chord line between the leading edge and the trailing edge defines an angle of incidence greater than zero degrees relative to the central plane.

In another construction, the present invention provides a bicycle frame that supports a front wheel and a rear wheel that defines a central plane. The bicycle frame includes a head tube, a bottom bracket configured to support a crank assembly, and a bicycle frame portion. The bicycle frame portion has a leading edge, a trailing edge, an inner surface extending between the leading edge and the trailing edge adjacent the central plane, and an outer surface extending between the leading edge and the trailing edge opposite the inner surface. The inner surface has a first camber profile and the outer surface has a second camber profile that is different from the first camber profile.

In another construction, the invention provides a bicycle frame that supports a front wheel and a rear wheel that defines a central plane. The bicycle frame includes a head tube, a bottom bracket configured to support a crank assembly, and a bicycle frame portion. The bicycle frame portion is defined by an asymmetric airfoil shape in cross-section and includes a leading edge and a trailing edge. The asymmetric airfoil shape defines a chord line and a mean camber line each extending between the leading edge and the trailing edge. The mean camber line intersects the chord line at an intersection point between the leading edge and the trailing edge.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

DETAILED DESCRIPTION

Figure 1:
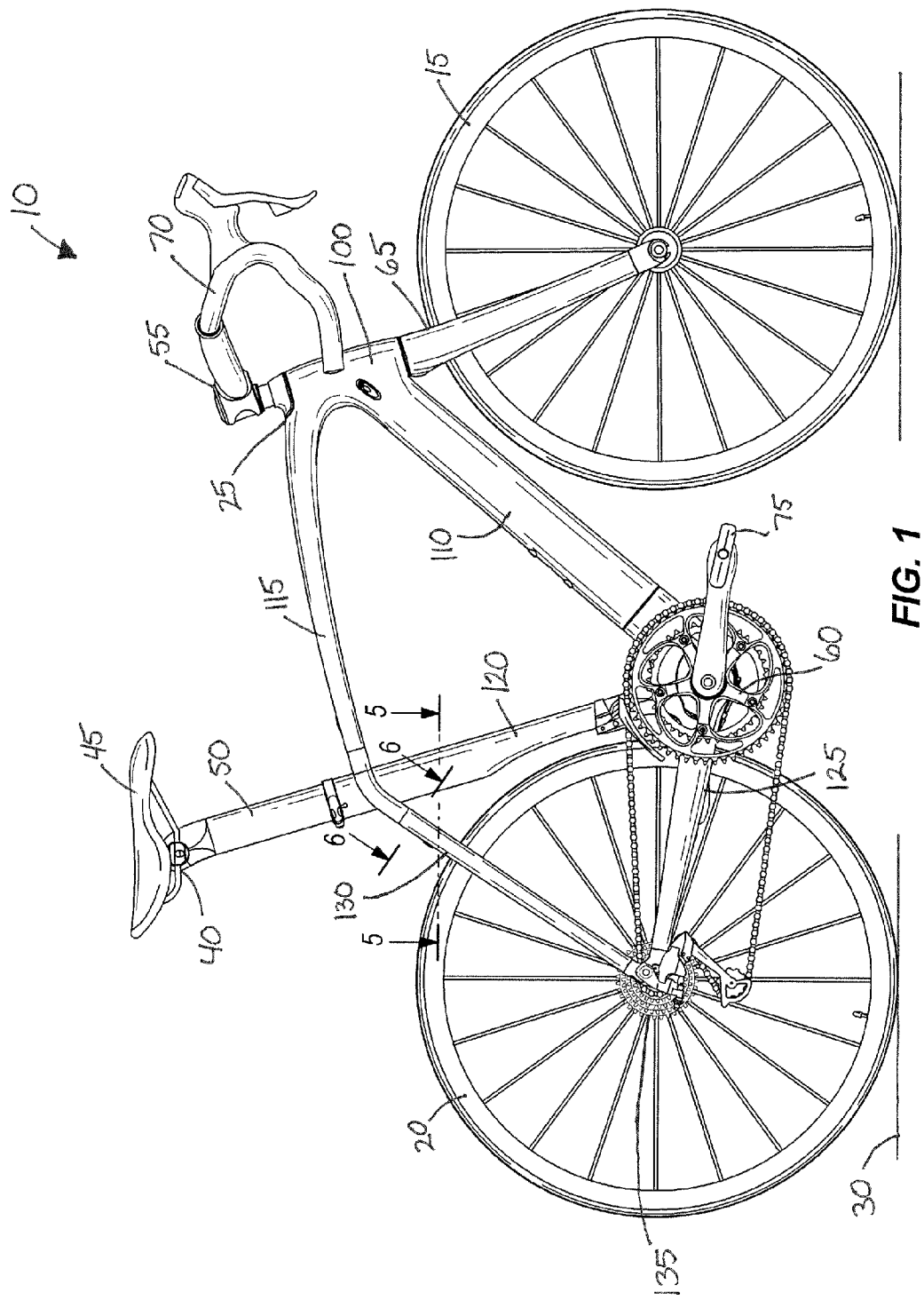
FIG. 1 is a side view of a bicycle including a frame embodying the present invention.
Figure 2:
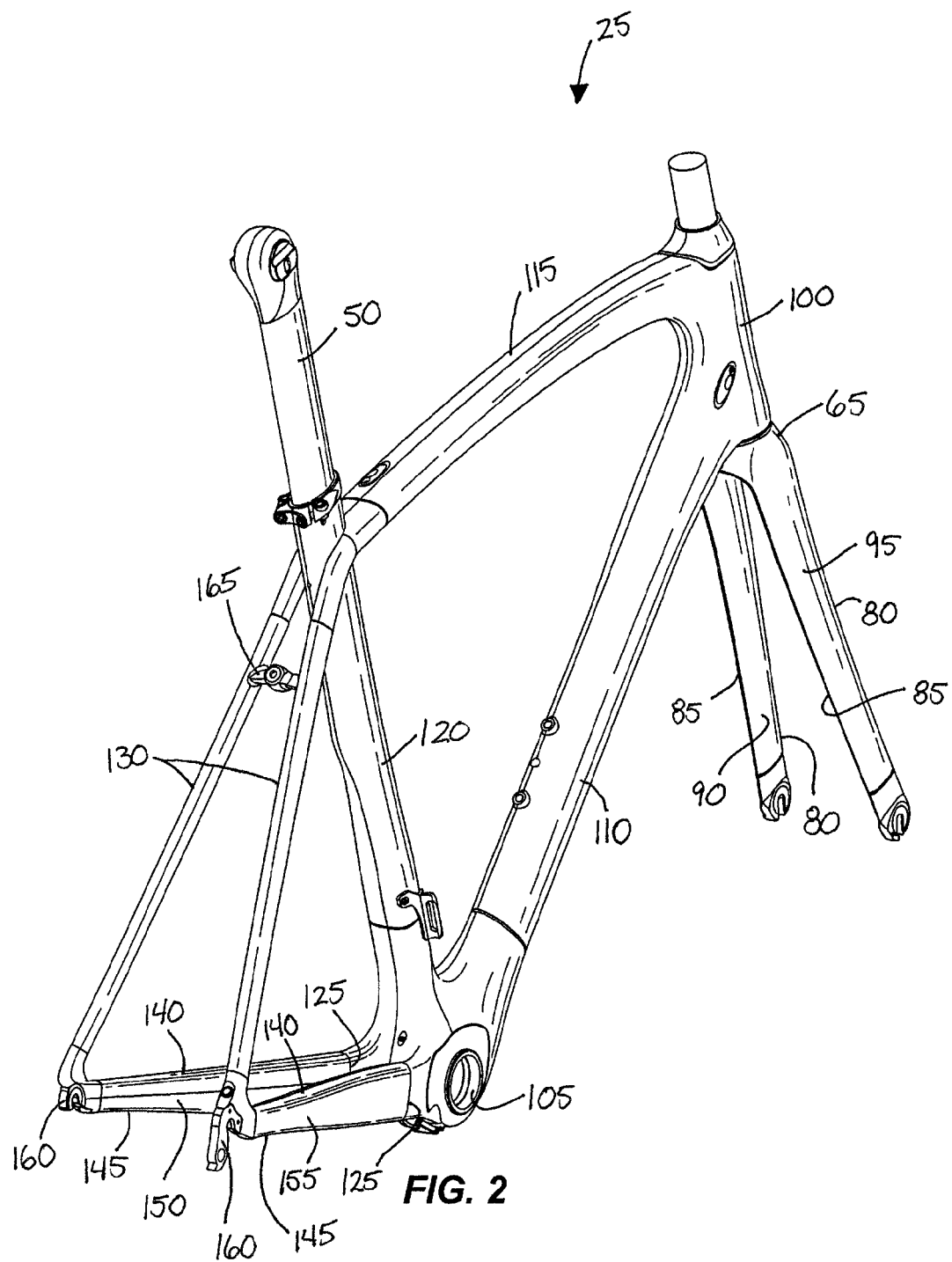
FIG. 2 is a perspective view of the bicycle frame of FIG. 1.

FIGS. 1 and 2 show a bicycle 10 that includes a front wheel 15, a rear wheel 20, and a frame 25. The front and rear wheels 15, 20 support the frame 25 above a riding surface 30. With reference to FIGS. 1, 4, 5, and 7, the rear wheel 20 defines a central plane 35 of the bicycle 10 that extends generally through the center of the frame 25, dividing the frame 25 into a left side portion and a right side portion. The frame 25 can be formed from any suitable material, such as composites, including carbon-fiber composites, aluminum, steel, and the like.

The bicycle 10 further includes a seat assembly 40 that has a seat 45 and a seat post 50 for supporting a rider, a steering assembly 55, and a crank assembly or crankset 60. The steering assembly 55 is rotatable by the rider to rotate the front wheel 15, and includes a front fork 65 and handlebars 70 that are coupled to the front fork 65 such that the handlebars 70 are rotatable by the rider to rotate the front fork 65 and the front wheel 15. The crankset 60 is utilized by the rider to drive the rear wheel 20 via pedals 75 to move the bicycle 10 along the riding surface 30.

With reference to FIGS. 1 and 2, the front fork 65 is shaped to include a leading edge 80 oriented toward a front of the bicycle 10, and a trailing edge 85 that is rearward of the leading edge 80. The front fork 65 also includes an inner surface that extends between the leading edge 80 and the trailing edge 85 adjacent the central plane 35, and an outer surface 95 that extends between the leading edge 80 and the trailing edge 85 opposite the inner surface 90. As illustrated, each of the inner surface 90 and the outer surface 95 of the front fork 65 has a camber or curvature between the leading edge 80 and the trailing edge 85.

The frame 25 includes a head tube 100 that receives a portion of the front fork 65, and a bottom bracket 105 that supports the crankset 60. The handlebars 70 are coupled to the front fork 65 above the head tube 100. As would be understood by one of skill in the art, the head tube 100 typically retains bearings (not shown) to facilitate rotation of the front fork 65 with respect to the head tube 100.

The frame 25 further includes a down tube 110, a top tube 115, a seat tube 120, chain stays 125, and seat stays 130. The down tube 110 extends from the head tube 100 generally downward and rearward to the bottom bracket 105. The top tube 115 is located above the down tube 110 and extends from the head tube 100 rearward to the seat tube 120. The seat tube 120 extends generally upward from the bottom bracket 105 to interconnect the top tube 115 and the down tube 110. As illustrated, the seat tube 120 is directly coupled (e.g., welded) to the top tube 115 and supports the seat 45.

Figure 3:
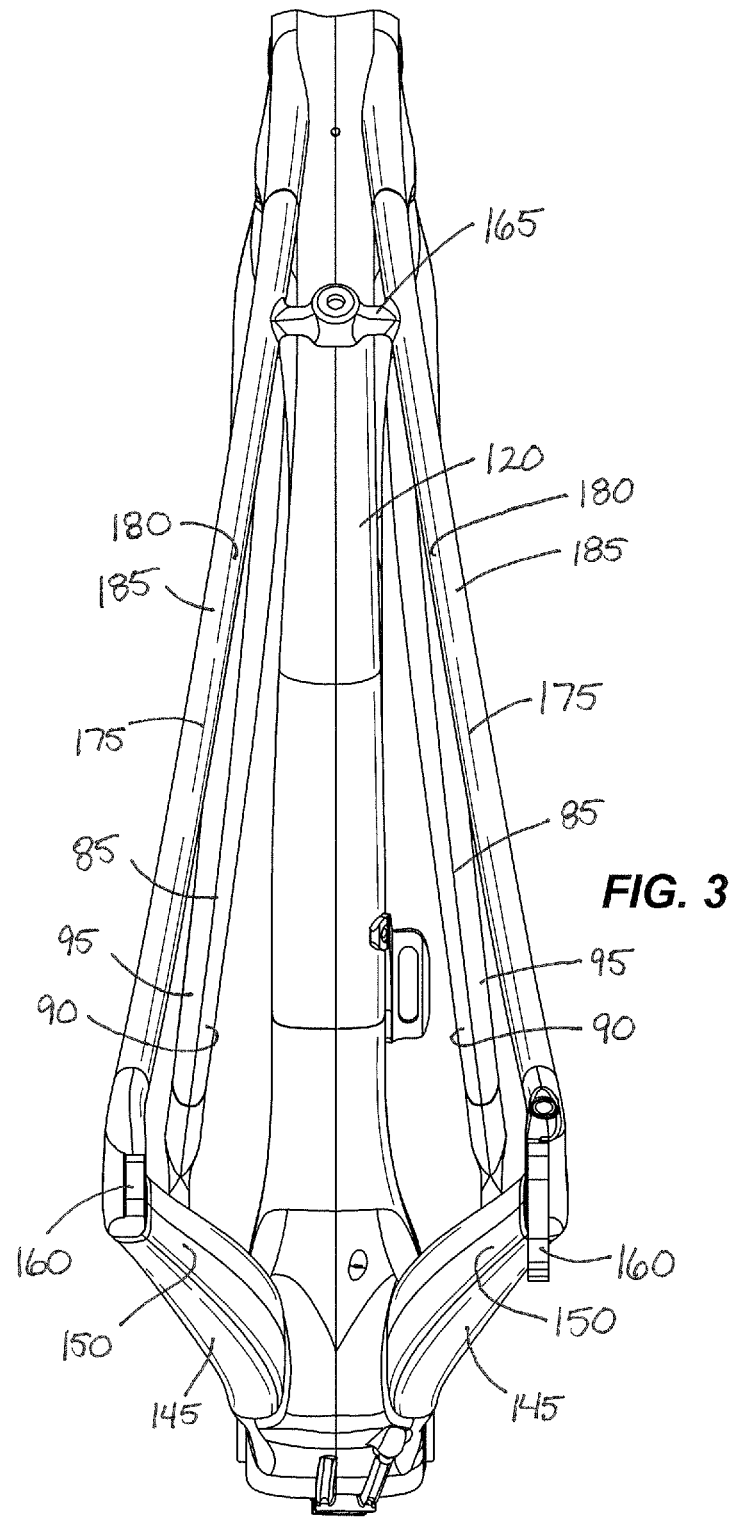
FIG. 3 is a rear view of the bicycle frame of FIG. 2.

Referring to FIGS. 1-4, the chain stays 125 extend from the bottom bracket 105 generally rearward to the seat stays 130. The chain stays 125 cooperate with the seat stays 130 to rotatably support the rear wheel 20 and a cassette 135. As shown in FIG. 3, each chain stay 125 includes a leading or top edge 140 and a trailing or bottom edge 145 that is generally opposite the top edge 140. Each chain stay 125 also includes an inner surface 150 that extends between the top edge 140 and the bottom edge 145 adjacent the central plane 35, and an outer surface 155 that extends between the top edge 140 and the bottom edge 145 opposite the inner surface 150. As illustrated, the inner surfaces 150 and the outer surfaces 155 of the chain stays 125 have a camber or curvature between the top edge 140 and the bottom edge 145.

FIGS. 1-4 show that the illustrated seat stays 130 are directly coupled to the seat tube 120 adjacent the connection between the top tube 115 and the seat tube 120 to support the seat 45. The seat stays 130 include dropouts 160 adjacent the rearward end to attach the rear wheel 20 to the frame 25 and to support the cassette 135. A brake bridge 165 spans between the seat stays 130 adjacent the end nearest the seat tube 120 for supporting a rear brake assembly (not shown).

Figure 5:
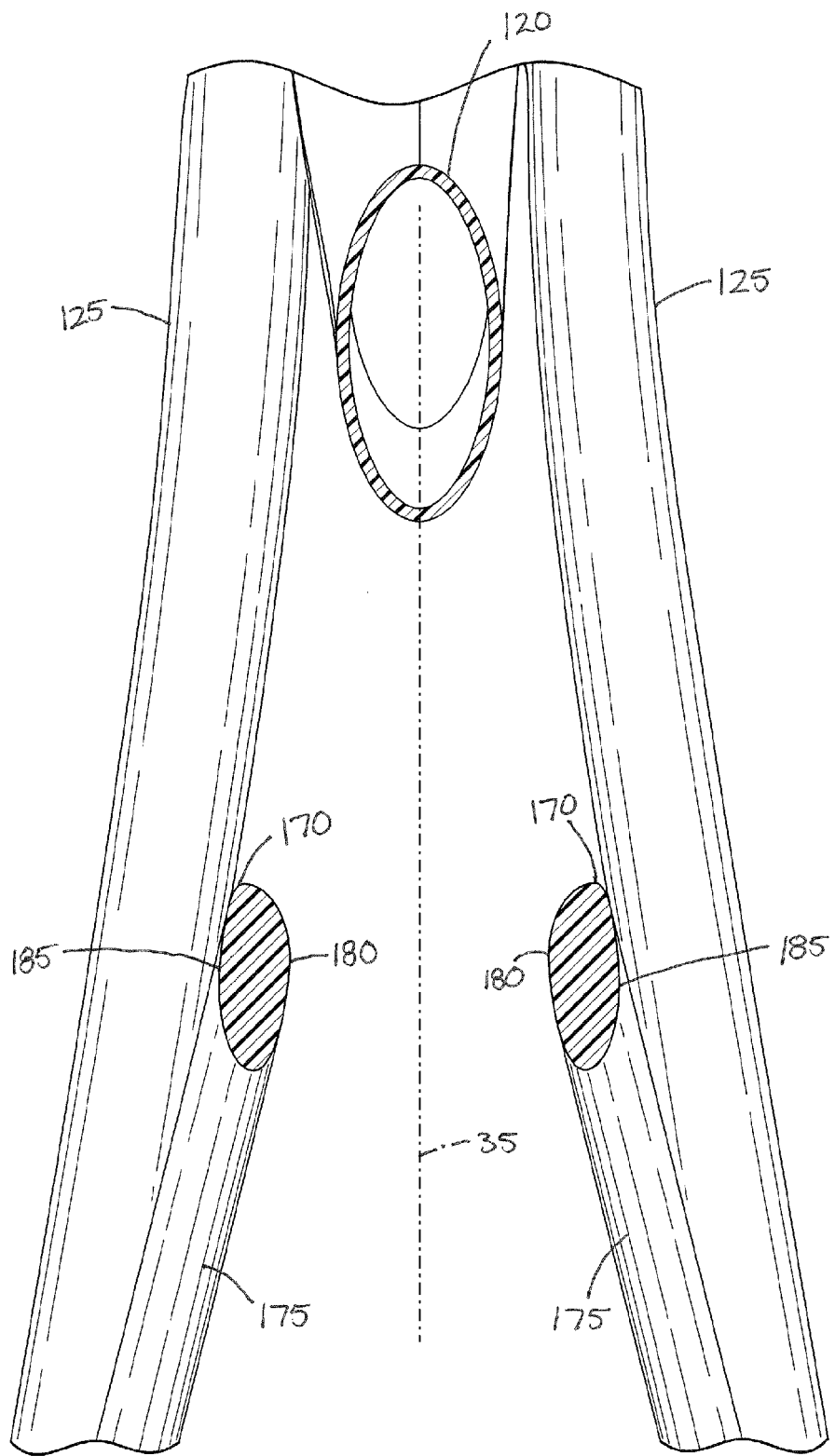
FIG. 5 is a cross-section view of the bicycle frame of FIG. 1 taken along line 5-5.
Figure 6:
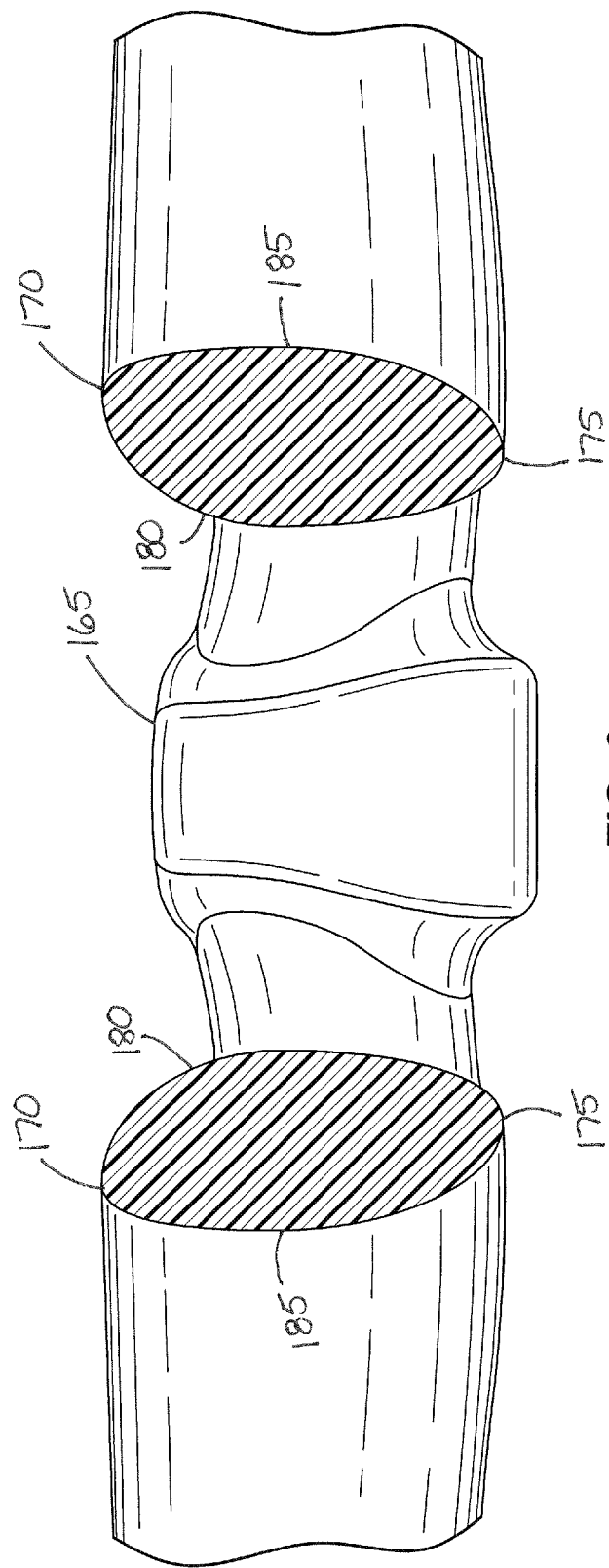
FIG. 6 is a cross-section view of the bicycle frame of FIG. 1 taken along line 6-6.
Figure 7:
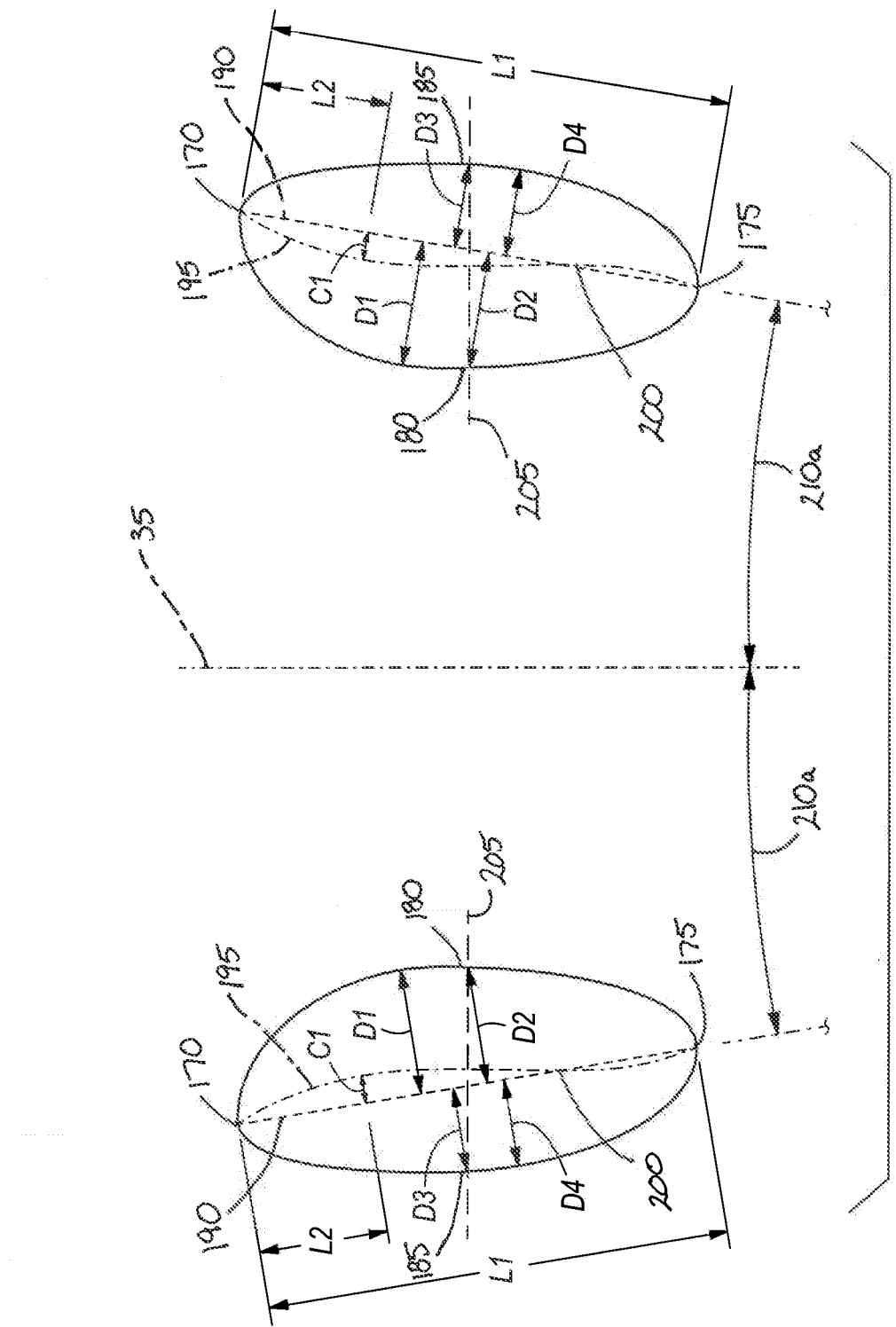
FIG. 7 is a schematic view of the portion of the bicycle illustrated in FIG. 6.

The front fork 65, the chain stay 125, and the seat stay 130 define bicycle frame portions of the frame 25. The bicycle frame portions can include a cross-sectional shape (e.g., symmetric or asymmetric) that provides a reduced overall drag at certain yaw or cross-wind angles. For example, FIGS. 5-7 show that each seat stay 130 is defined by an asymmetric airfoil shape in cross-section that has a chord line 190 connecting a leading edge 170 and a trailing edge 175 of the asymmetrical seat stay. The chord line 190 is a linear or straight line extending between the leading edge 170 and the trailing edge 175. The chord line 190 has a first length L1 along the characteristic longitudinal dimension of the asymmetric seat stay 130. In other words, the first length L1 of the chord line 190 is measured parallel to the chord line 190.

Each seat stay 130 is defined by an inner surface 180 that extends between the leading edge 170 and the trailing edge 175 adjacent the central plane 35, and an outer surface 185 that extends between the leading edge 170 and the trailing edge 175 opposite the inner surface 180. FIGS. 6 and 7 show that the inner surface 180 is defined by a first camber profile, and the outer surface 185 is defined by a second camber profile that is different from the first camber profile. The first and second camber profiles cooperate to define the asymmetric airfoil shape of the seat stays 130.

With continued reference to FIG. 7, a mean camber line 195 connects the leading edge 170 to the trailing edge 175. The mean camber line 195 is a curvilinear line between the leading edge 170 and the trailing edge 175 that is equidistant from the inner surface 180 and the outer surface 185. The mean camber line 195 cooperates with other characteristics of the asymmetric seat stay 130 to define aerodynamic characteristics of the seat stay 130. As illustrated, the mean camber line 195 intersects the chord line 190 at one intersection point 200 between the leading edge 170 and the trailing edge 175. A dividing line 205 that is perpendicular to the central plane 35 divides the seat stays 130 into forward and rearward portions relative to a forward direction of the bicycle 10. In other words, the dividing line 205 is equidistant from the leading edge 170 and the trailing edge 175 as measured parallel to the central plane 35. The illustrated intersection point 200 is rearward of the dividing line 205.

The mean camber line 195 has a maximum camber distance C1 that is measured perpendicular to the chord line 190 where the mean camber line 195 is spaced farthest from the chord line 190. As illustrated, the maximum camber distance C1 is closer to the leading edge 170 than the trailing edge 175, and is spaced from the leading edge 170 along the chord line 190 at a point that defines a second length L2 relative to the leading edge 170. As illustrated, the second length L2 is about 25 percent of the first length L1. Put another way, a first ratio of the second length L2 to the first length L1 is about 0.25. In some constructions, the first ratio can be between about 0.15 and about 0.40. In other constructions, the first ratio can be between about 0.10 and about 0.50.

With reference to FIG. 7, the portion of the inner surface 180 adjacent the leading edge (i.e., forward of the dividing line 205) is spaced a first distance D1 from the chord line 190. As illustrated, the first distance D1 is measured where the forward portion of the inner surface 180 is farthest from the chord line 190. The portion of the inner surface 180 adjacent the trailing edge (i.e., rearward of the dividing line 205) is spaced a second distance D2 from the chord line 190. The second distance D2 is measured where the rearward portion of the inner surface 180 is farthest from the chord line 190. The first camber profile is shaped such that the distance D1 is larger than the distance D2. That is, the forward portion of the inner surface 180 adjacent the leading edge 170 is farther from the chord line 190 than the rearward portion of the inner surface 180 adjacent the trailing edge 175. A second ratio is defined by the first distance D1 to the second distance D2. In the illustrated construction, the second ratio is about 1.10. In other constructions, the second ratio can be greater than 1.00.

The portion of the outer surface 185 adjacent the leading edge (i.e., forward of the dividing line 205) is spaced a third distance D3 from the chord line 190. As illustrated, the third distance D3 is measured where the forward portion of the outer surface 185 is farthest from the chord line 190. The portion of the outer surface 185 adjacent the trailing edge (i.e., rearward of the dividing line 205) is spaced a fourth distance D4 from the chord line 190. The fourth distance D4 is measured where the rearward portion of the outer surface 185 is farthest from the chord line 190. The second camber profile is shaped such that the distance D4 is larger than the distance D3. That is, the forward portion of the outer surface 185 adjacent the leading edge 175 is closer to the chord line 190 than the rearward portion of the outer surface 185 adjacent the trailing edge 170. A third ratio is defined by the fourth distance D4 to the second distance D3. In the illustrated construction, the third ratio is about 1.05. In other constructions, the third ratio can be greater than 1.00.

As shown in FIG. 7, the chord line 190 defines an angle of incidence 210*a* relative to the central plane 35. In the illustrated construction, the angle of incidence 210*a* is about 10 degrees. In some constructions, the angle of incidence 210*a* can be between about 3 degrees and about 25 degrees. In other constructions, the angle of incidence 210*a* can be between about 5 degrees and about 15 degrees. In other constructions, the angle of incidence 210*a* can be between about 6 degrees and about 12 degrees. In still other constructions, the angle of incidence 210*a* can be greater than 0 degrees relative to the central plane 35.

Figure 8:
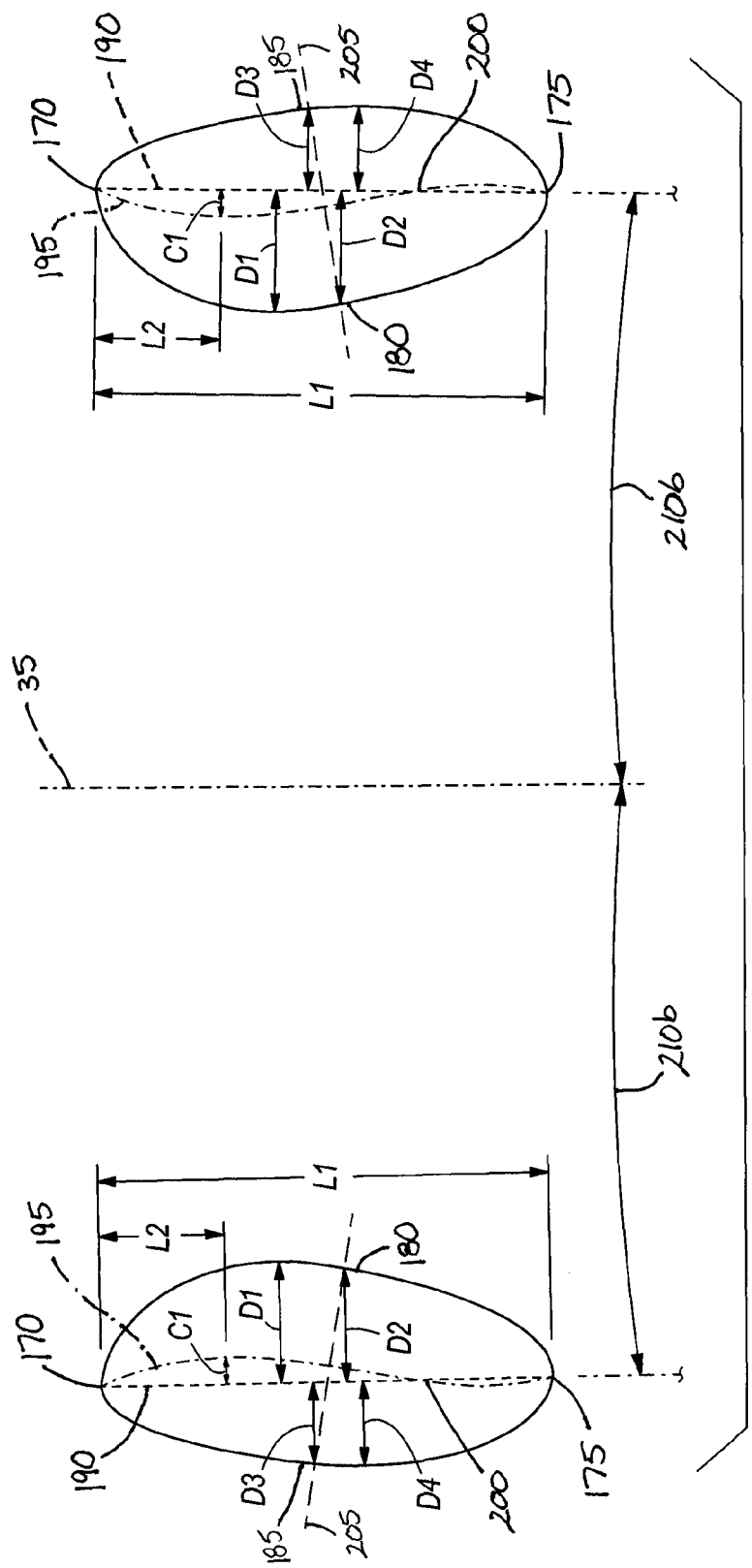
FIG. 8 is a schematic view of another portion of the bicycle of FIG. 1.

In some constructions, the portion of the seat stay 130 that is closest to the cassette 135 (i.e., the rear or lower portion of each seat stay 130) an angle of incidence that is different from an angle of incidence of the portion of the seat stay 130 closest to the seat post 50 (i.e., the front or upper portion of each seat stay 130). For example, FIG. 7 shows that the portion of the seat stay 130 closest to the seat post 50 defines the angle of incidence 210*a* (i.e., a first angle of incidence 210*a*), and FIG. 8 shows that the portion of the seat stay 130 closest to the cassette 135 defines a second angle of incidence 210*b* that is smaller than the first angle of incidence 210*a* (e.g., the first angle of incidence 210*a* can be about 10 degrees and the second angle of incidence can be less than 10 degrees). In some constructions, the second angle of incidence 210*b* is less than about 5 degrees relative to central plane 35 (e.g., substantially parallel to the central plane 35).

Figure 4:
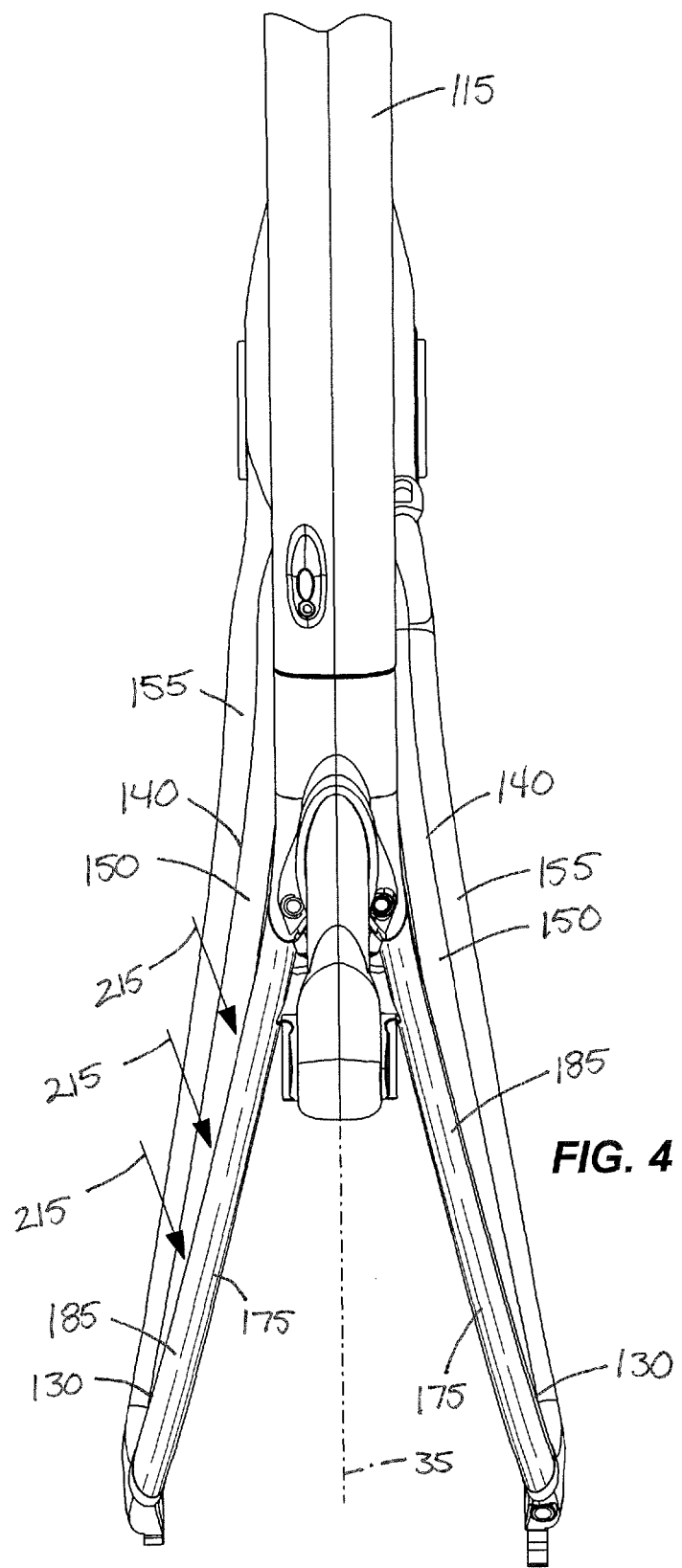
FIG. 4 is a top view of the bicycle frame of FIG. 2.

A head-wind encountered by the bicycle 10 flows directly toward the front of the bicycle 10 such that the wind flows toward and across the bicycle 10 generally parallel to the central plane 35 (i.e., the wind defines a zero degree yaw relative to the central plane 35). A cross-wind (illustrated by arrows 215 in FIG. 4) encountered by the bicycle 10 flows toward and across the bicycle 10 at a non-zero angle relative to the central plane 35 (i.e., a non-zero degree yaw relative to the central plane 35). Generally, cross-winds up to about 8 degrees relative to the central plane 35 do not have much direct impact on the seat stays 130 due to shielding from a rider. As illustrated in FIG. 4, the cross-wind 215 approaches the bicycle 10 at approximately 15 degrees relative to the central plane 35, although cross-winds at other angles can also impact the bicycle 10.

The seat stay 130 first impacted by a cross-wind is defined as the upwind or upstream seat stay 130, and the other seat stay 130 is defined as the downwind or downstream seat stay 130. When the bicycle 10 encounters a cross-wind, the upwind seat stay 130 encounters more airflow than the downwind seat stay 130 due to partial shielding of the downwind seat stay 130 by the rear wheel 20, the seat tube 120, the brake bridge 165, and the rider. In a cross-wind, the asymmetric shape of the upwind seat stay 130 makes the seat stay 130 more aerodynamic (i.e., the asymmetric seat stay 130 adds to the aerodynamic performance or increases the aerodynamic advantage of the bicycle 10). The downwind seat stay 130 slightly detracts from the aerodynamic performance (i.e., results in an aerodynamic disadvantage) for the bicycle 10. However, the increase in the aerodynamic performance of the upwind seat stay 130 is larger than any negative impact on performance caused by the downwind seat stay 130 due to partial shielding of the downwind seat stay 130 by one or more components of the bicycle 10 and/or the rider. As a result, the seat stays 130 provide a net aerodynamic advantage or increase in aerodynamic performance of the bicycle 10 when the bicycle 10 is subjected to a cross-wind.

In a cross-wind, the asymmetric shape of the seat stays 130 provides a higher airflow attachment adjacent the trailing edge 175 relative to seat stays that have a symmetric shape with a chord line that is parallel to the central plane 35. The higher airflow attachment reduces the size of the wake region adjacent the trailing edge 175, which makes the bicycle 10 more aerodynamic (e.g., reduced drag).

When the bicycle 10 encounters a head-wind, any aerodynamic disadvantage caused by the angles of incidence 210*a*, 210*b* of the asymmetric seat stays 130 relative to the central plane 35 is extremely small or non-existent due to shielding of the seat stays 130 by other bicycle components and/or the rider. Also, flow separation for the asymmetric seat stays 130 in a head-wind is not substantially impacted because the frontal area of the seat stays 130 (i.e., the maximum thickness of the seat stays 130 measured perpendicular to the central plane 35 and parallel to the dividing line 205) impacted by a head-wind is similar to the frontal area of conventional seat stays. In constructions of the bicycle 10 that has seat stays 130 with different angles of incidence between the upper portions and the lower portions of the seat stays 130, the angle of incidence 210*a* makes the upper portions of the seat stays 130 more aerodynamic in a cross-wind, while the angle of incidence 210*b* makes the lower portions of the seat stays 130 more aerodynamic in a head-wind.

Various features and advantages of the invention are set forth in the following claims.

What is claimed is:

1. A bicycle frame configured to support a front wheel and a rear wheel defining a central plane, the bicycle frame comprising:
    a head tube;
    a bottom bracket configured to support a crank assembly; and
    a seat stay including a leading edge and a trailing edge oriented such that a chord line between the leading edge and the trailing edge defines an angle of incidence greater than zero degrees relative to the central plane,
    wherein in horizontal cross-section, the leading is located farther from the central plane than an entirety of the trailing edge.

2. The bicycle frame of claim 1, wherein the seat stay includes an inner surface extending between the leading edge and the trailing edge adjacent the central plane, and an outer surface extending between the leading edge and the trailing edge opposite the inner surface, and wherein the inner surface has a first camber defined by a first profile and the outer surface has a second camber defined by a second profile that is different from the first profile.

3. The bicycle frame of claim 2, wherein a first portion of the inner surface adjacent the leading edge is spaced farther from the chord line than a second portion of the inner surface adjacent the trailing edge, and wherein a first portion of the outer surface adjacent the leading edge is spaced closer to the chord line than a second portion of the outer surface adjacent the trailing edge.

4. The bicycle frame of claim 1, wherein the angle of incidence is between about 3 degrees and about 25 degrees.

5. The bicycle frame of claim 1, wherein the angle of incidence is between about 5 and about 15 degrees.

6. The bicycle frame of claim 1, wherein the angle of incidence is between about 6 degrees and about 12 degrees.

7. The bicycle frame of claim 1, wherein the angle of incidence is about 10 degrees.

8. The bicycle frame of claim 1, wherein the seat stay is defined by an asymmetric airfoil shape in cross-section.

9. A bicycle frame configured to support a front wheel and a rear wheel defining a central plane, the bicycle frame comprising:
    a head tube;
    a bottom bracket configured to support a crank assembly; and
    a bicycle frame portion including a leading edge, a trailing edge, an inner surface extending between the leading edge and the trailing edge adjacent the central plane, and an outer surface extending between the leading edge and the trailing edge opposite the inner surface, the inner surface having a first camber profile and the outer surface having a second camber profile different from the first camber profile,
    wherein the bicycle frame portion is defined by an asymmetric airfoil shape in cross-section, and wherein the asymmetric airfoil shape defines a chord line extending between the leading edge and the trailing edge, and wherein a first portion of the inner surface adjacent the leading edge is spaced farther from the chord line than a second portion of the inner surface adjacent the trailing edge, and wherein a first portion of the outer surface adjacent the leading edge is spaced closer to the chord line than a second portion of the outer surface adjacent the trailing edge.

10. The bicycle frame of claim 9, wherein the chord line defines an angle of incidence greater than zero degrees relative to the central plane.

11. The bicycle frame of claim 10, wherein the angle of incidence is about 9 degrees.

12. The bicycle frame of claim 9, wherein the bicycle frame portion is at least one of a seat stay, a chain stay, and a fork.

13. A bicycle frame configured to support a front wheel and a rear wheel defining a central plane, the bicycle frame comprising:
    a head tube;
    a bottom bracket configured to support a crank assembly; and
    a bicycle frame portion defined by an asymmetric airfoil shape in cross-section and including a leading edge and a trailing edge, the asymmetric airfoil shape defining a chord line and a mean camber line each extending between the leading edge and the trailing edge, the mean camber line intersecting the chord line at an intersection point between the leading edge and the trailing edge,
    wherein the bicycle frame portion includes an inner surface extending between the leading edge and the trailing edge adjacent the central plane, and an outer surface extending between the leading edge and the trailing edge opposite the inner surface, and wherein the inner surface has a first camber defined by a first profile and the outer surface has a second camber defined by a second profile that is different from the first profile, and
    wherein a first portion of the inner surface adjacent the leading edge is spaced farther from the chord line than a second portion of the inner surface adjacent the trailing edge, and wherein a first portion of the outer surface adjacent the leading edge is spaced closer to the chord line than a second portion of the outer surface adjacent the trailing edge.

14. The bicycle frame of claim 13, wherein the chord line defines an angle of incidence that is greater than zero degrees relative to the central plane.

15. The bicycle frame of claim 13, wherein the bicycle frame portion is at least one of a seat stay, a chain stay, and a fork.

* * * * *